(12) United States Patent
Edwards et al.

(10) Patent No.: US 8,177,418 B2
(45) Date of Patent: May 15, 2012

(54) APPARATUS FOR MAKING, STORING, AND TRANSPORTING FROZEN CONFECTIONS AND METHOD

(76) Inventors: Debra Edwards, Carlsbad, NM (US); Paul M. Edwards, Carlsbad, NM (US)

( * ) Notice: Subject to any disclaimer, the term of this patent is extended or adjusted under 35 U.S.C. 154(b) by 722 days.

(21) Appl. No.: 12/290,177

(22) Filed: Oct. 28, 2008

(65) Prior Publication Data

US 2009/0223386 A1 Sep. 10, 2009

Related U.S. Application Data (60) Provisional application No. 61/068,307, filed on Mar. 6, 2008.

(51) Int. Cl.
*A23G 9/00* (2006.01)
*B01F 7/16* (2006.01)
*A47J 41/00* (2006.01)

(52) U.S. Cl. ........ 366/249; 366/252; 366/206; 366/347; 366/220; 99/348

(58) Field of Classification Search .................. 366/249, 366/251, 252, 280, 281, 144, 149, 347; 99/348
See application file for complete search history.

(56) References Cited

U.S. PATENT DOCUMENTS

| | | | |
|---|---|---|---|
| 689,093 A | 12/1901 | Kestenbaum | |
| 1,698,402 A * | 1/1929 | Harris | 366/247 |
| 1,944,114 A * | 1/1934 | Skowlund | 366/246 |
| 2,025,379 A * | 12/1935 | Croasdale, Jr. | 366/247 |
| 2,272,125 A * | 2/1942 | Loone | 74/16 |
| 2,286,913 A * | 6/1942 | Kelly et al. | 366/251 |
| 2,557,813 A | 6/1951 | Burton | |
| 2,599,021 A * | 6/1952 | Se Bastian | 366/204 |
| 2,702,172 A * | 2/1955 | Focke | 244/48 |
| 2,764,177 A * | 9/1956 | Paasche | 137/209 |
| 2,861,211 A * | 11/1958 | Brown et al. | 313/348 |
| 3,697,053 A * | 10/1972 | Will | 366/343 |
| 3,780,536 A | 12/1973 | Fishman et al. | |
| 3,952,538 A * | 4/1976 | Warlick | 62/342 |
| 4,488,817 A | 12/1984 | Uesaka et al. | |
| 4,688,398 A | 8/1987 | Baek | |
| 4,832,501 A * | 5/1989 | McCauley | 366/279 |
| 4,910,973 A * | 3/1990 | Osrow et al. | 62/342 |
| 5,368,388 A * | 11/1994 | Fillon | 366/245 |
| 5,516,208 A * | 5/1996 | Givant | 366/251 |
| 6,085,645 A * | 7/2000 | Huang | 99/455 |
| 6,113,258 A * | 9/2000 | Ardent | 366/282 |
| 6,510,704 B1 | 1/2003 | Russell | |
| 6,719,451 B1 * | 4/2004 | Yue | 366/130 |
| 6,886,974 B1 * | 5/2005 | Millan et al. | 366/191 |
| 6,945,688 B2 * | 9/2005 | Huyser et al. | 366/130 |
| 2006/0101842 A1 | 5/2006 | Boulos et al. | |

* cited by examiner

*Primary Examiner* — Joseph Del Sole
*Assistant Examiner* — Nahida Sultana
(74) *Attorney, Agent, or Firm* — James Ray & Assoc (57) ABSTRACT

An apparatus for making, storing, and transporting frozen confections includes a first housing member. A second housing member fits within such first housing member. A mixing member is engageable within such second housing member for mixing predetermined ingredients. A first lid member having an aperture disposed therethrough for receiving a first predetermined end of such mixing member releasably covers such second housing. A motor, connectable to at least one of such first housing member, such second housing member, such first lid member, such mixing member, and a combination thereof, enables at least one of such second housing member and such mixing member to rotate such that such predetermined ingredients are mixed. A securing mechanism secures such motor member to such apparatus. A power source is operably connected to such motor.

19 Claims, 4 Drawing Sheets

FIG. 5

US 8,177,418 B2

APPARATUS FOR MAKING, STORING, AND TRANSPORTING FROZEN CONFECTIONS AND METHOD

CROSS REFERENCE TO RELATED APPLICATION

This patent application is related to and claims priority from U.S. Provisional Patent Application Ser. No. 61/068,307 filed Mar. 6, 2008.

FIELD OF THE INVENTION

The present invention relates, in general, to ice cream makers and frozen confection makers, and more particularly, this invention relates to an apparatus for making, storing, and transporting frozen confections such as ice cream.

BACKGROUND OF THE INVENTION

Prior to the conception and development of the present invention, ice cream makers, as are generally well known in the prior art, have become popular in recent years. Such ice cream makers enable people to make their own ice cream which can be fun to do and which yields a tasty treat for consumption thereafter.

Unfortunately, homemade ice cream melts just as quickly as store bought ice cream and persons attempting to transport homemade ice cream or any frozen dessert are often disappointed to find such ice cream or dessert has melted prior to serving. Therefore there is a need for an all inclusive device which can be used to make ice cream and other frozen treats and which includes a portion which is separable from the mixing components of such device and such portion being capable of retaining such ice cream and/or frozen dessert in a frozen or semi-frozen state such that such ice cream and/or frozen dessert may be transported and/or stored for a predetermined amount of time prior to melting.

Specifically of interest to the present invention are the following: Russell, U.S. Pat. No. 6,510,704, discloses a battery-operated ice cream maker to be used in the freezer compartment of a refrigerator and/or ice chest and which can make two flavors of ice cream at the same time.

Baek, U.S. Pat. No. 4,688,398, discloses a freezing container comprising an inner bowl for containing a product to be frozen, an outer bowl sealed and containing an expandable freezing agent and insulation around the outer bowl; such container is meant for use in a machine preparing frozen desserts.

Uesaka, et al, U.S. Pat. No. 4,488,817, and Fishman, et al, U.S. Pat. No. 3,780,536, both disclose devices for making frozen confections such as ice cream.

Burton, U.S. Pat. No. 2,557,813, discloses an apparatus and method for making frozen confections. Such apparatus is meant to keep such frozen confections cold for long periods of time.

Kestenbaum, U.S. Pat. No. 689,093, discloses a vessel or can for storing or transporting ice cream.

Boulos, U.S. Publication No. 2006/0101842 discloses an apparatus for making ice cream or other dessert through the use of a canister assembly containing a freezable material. The canister assembly includes at least two separable canister subassemblies. The subassemblies may be nestable so as to minimize storage space.

None of the above cited references provide the benefits attendant with the present invention.

SUMMARY OF THE INVENTION

The present invention provides an apparatus for making, storing, and transporting frozen confections. Such apparatus includes a first substantially hollow housing member having an opening at a first predetermined end thereof. Such first housing member is manufactured from a first predetermined material and has a first predetermined size and a first predetermined shape. A second substantially hollow housing member fits within a first predetermined interior portion of such first housing member. Such second housing member has an opening at a first predetermined end thereof for receiving at least one of predetermined ingredients for making a frozen confection, a predetermined consumable item, and a combination thereof. Such second housing member is manufactured from a second predetermined material and has a second predetermined size and a second predetermined shape. A mixing member is releasably disposable within a predetermined interior portion of such second housing member for mixing such predetermined ingredients. A first lid member is releasably connectable to such second housing member for covering such opening at such first end of such second housing member. Such first lid member has an aperture disposed therethrough for receiving a first predetermined end of such mixing member. Such first lid member is manufactured from a third predetermined material and has a third predetermined size and a third predetermined shape. A motor is operably connectable to at least one of such first housing member, such second housing member, such first lid member, such mixing member, and a combination thereof for enabling at least one of such second housing member and such mixing member to rotate in a predetermined direction while maintaining an opposite one of such second housing member and such mixing member in a stationary position such that such predetermined ingredients are mixed together. A securing means releasably secures such motor to at least one of such first housing member, such second housing member, such first lid member, such mixing member, and such combination thereof. A power source is operably connected to such motor for supplying power thereto.

According to another embodiment, a method of making frozen confections is provided. Such method includes the steps of providing an apparatus for making, storing, and transporting frozen confections, such apparatus having a first substantially hollow housing member having an opening at a first predetermined end thereof, such first housing member being manufactured from a first predetermined material and having a first predetermined size and a first predetermined shape, a second substantially hollow housing member for fitting within a predetermined interior portion of such first housing member, such second housing member having an opening at a first predetermined end thereof for housing at least one of predetermined ingredients for making a frozen confection, a predetermined consumable item, and a combination thereof, such second housing member being manufactured from a second predetermined material and having a second predetermined size and a second predetermined shape, a mixing member releasably engageable within an interior portion of such second housing member for mixing such predetermined ingredients, a first lid member releasably connectable to such second housing member for covering such opening at such first end of such second housing member, such first lid member having an aperture disposed therethrough for receiving a first predetermined end of such mixing member, such first lid member being manufactured from a third predetermined material and having a third predetermined size and a third predetermined shape, a motor operably connectable to at least one of such first housing member, such second housing member, such first lid member, such mixing member, and a combination thereof for enabling at least one of such second housing member and such mixing member to rotate in a predetermined direction while maintaining an opposite one of such second housing member and such mixing member in a stationary position such that such predetermined ingredients are mixed together, a securing means for releasably securing such motor member to at least one of such first housing member, such second housing member, such first lid member, such mixing member, and a combination thereof, a power source operably connected to such motor for supplying power thereto. Such method further includes the steps of providing such predetermined ingredients for making a frozen confection, placing such mixing member within such second housing member, placing such predetermined ingredients within such second housing member, covering such second housing member with such first lid member such that such first end of such mixing member is disposed within such aperture, placing such second housing within such first housing member, providing a predetermined amount of salt and a predetermined amount of ice and placing such predetermined amount of salt and such predetermined amount of ice between an inner wall of such first housing member and an outer wall of such second housing member, securing such motor to at least one of such first housing member, second housing member, such first lid member, such mixing member, and a combination thereof, turning such motor on, and turning such motor off when such predetermined ingredients are mixed and a predetermined frozen confection has formed.

OBJECTS OF THE INVENTION

It is, therefore, one of the primary objects of the present invention to provide an all in one unit for making and transporting ice cream and other frozen confections and keeping such ice cream and frozen confections cold or frozen until ready for consumption.

Another object of the present invention is to provide an ice cream maker which is portable.

Still another object of the present invention is to provide an insulated unit which can be used to make ice cream and then which can be transformed into a portable cooler for transporting such ice cream.

Yet another object of the present invention is to provide a insulated container for holding between about 2 quarts of ice cream and about 6 quarts of ice cream which can be used to transport such ice cream and keep such ice cream from melting for a predetermined amount of time.

An additional object of the present invention is to provide a motorized ice cream maker and transporting device which includes an inner container for housing ingredients for making ice cream, ice cream, and frozen confections and in which ice cream can be made, and an outer container for providing insulation, such inner container fitting within such outer container but leaving enough space between such inner container and such outer container for receiving a predetermined amount of salt and a predetermined amount of ice for creating a cold environment around such inner container such that ice cream may be made and may be kept frozen for a time period as desired by a user. It is an additional object of the present invention to provide such outer container with a draining means, such as a spigot, disposed on a bottom portion of said outer container such that as such ice melts into water such water may be drained out of such outer container thereby making room for the addition of fresh ice and salt.

In addition to the various objects and advantages of the present invention described with some degree of specificity above it should be obvious that additional objects and advantages of the present invention will become more readily apparent to those persons who are skilled in the relevant art from the following more detailed description of the invention, particularly, when such description is taken in conjunction with the attached drawing figures and with the appended claims.

BRIEF DESCRIPTION OF A PRESENTLY PREFERRED AND VARIOUS ALTERNATIVE EMBODIMENTS OF THE INVENTION

Prior to proceeding to the more detailed description of the present invention it should be noted that, for the sake of clarity and understanding, identical components which have identical functions have been identified with identical reference numerals throughout the several views illustrated in the drawing figures.

Reference is now made, more particularly, to FIGS. 1-6.

An apparatus, generally designated 10, for making, storing, and transporting frozen confections is provided.

Such apparatus 10 includes a first substantially hollow housing member 12 having an opening 14 at a first predetermined end 16 thereof. Such first housing member 12 is manufactured from a first predetermined material and has a first predetermined size and a first predetermined shape.

It is presently preferred that such first housing member 12 is insulated. It is presently preferred that such first predetermined material is plastic. It is presently preferred that such first predetermined shape is a cylinder.

A second substantially hollow housing member 18 fits within a first predetermined interior portion of such first housing member 12. Such second housing member 18 has an opening 15 at a first predetermined end 22 thereof for receiving at least one of predetermined ingredients for making a frozen confection, a predetermined consumable item, and a combination thereof. It is meant that such predetermined ingredients may include ice cream mix, however, the device is not meant to be limited as such and such predetermined ingredients may include any ingredients which may be combined to form a desired frozen confection.

Such second housing member 18 is manufactured from a second predetermined material and has a second predetermined size and a second predetermined shape. It is presently preferred that such second predetermined material is a metal. It is presently preferred that such second predetermined shape is a cylinder.

Figure 1:
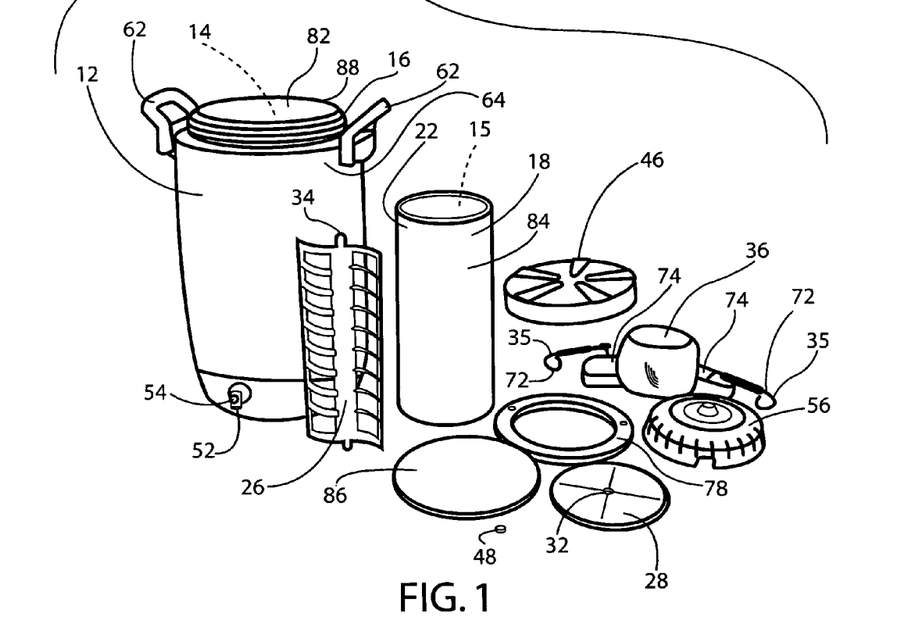
FIG. 1 is a partial perspective view of the invention according to one embodiment of the invention, in which various parts of the invention are not yet assembled with each other.

A mixing member 26 is releasably disposable within a predetermined interior portion of such second housing member 18 for mixing such predetermined ingredients.

Figure 2:
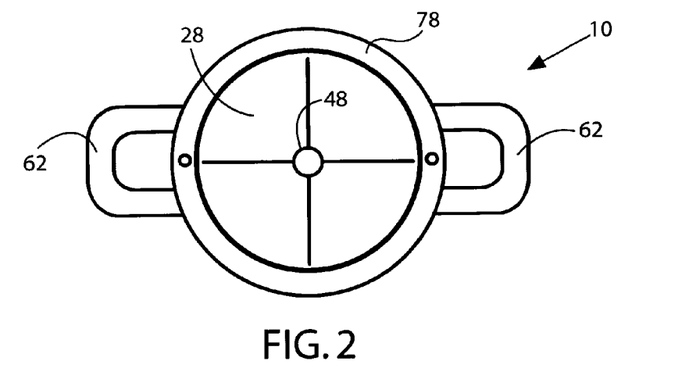
FIG. 2 is a partial perspective top view of the invention according to one embodiment of the invention in which such first housing member includes handles and in which the invention includes a ring member and an insert member for filling an aperture disposed within such first lid member.

A first lid member 28 is releasably connectable to such second housing member 18 for covering such opening 15 at such first end of such second housing member 18. Such first lid member 28 has an aperture 32 disposed therethrough for receiving a first predetermined end 34 of such mixing member 26. Such first lid member 28 is manufactured from a third predetermined material and has a third predetermined size and a third predetermined shape. It is presently preferred that such first lid member 28 is insulated.

Figure 3:
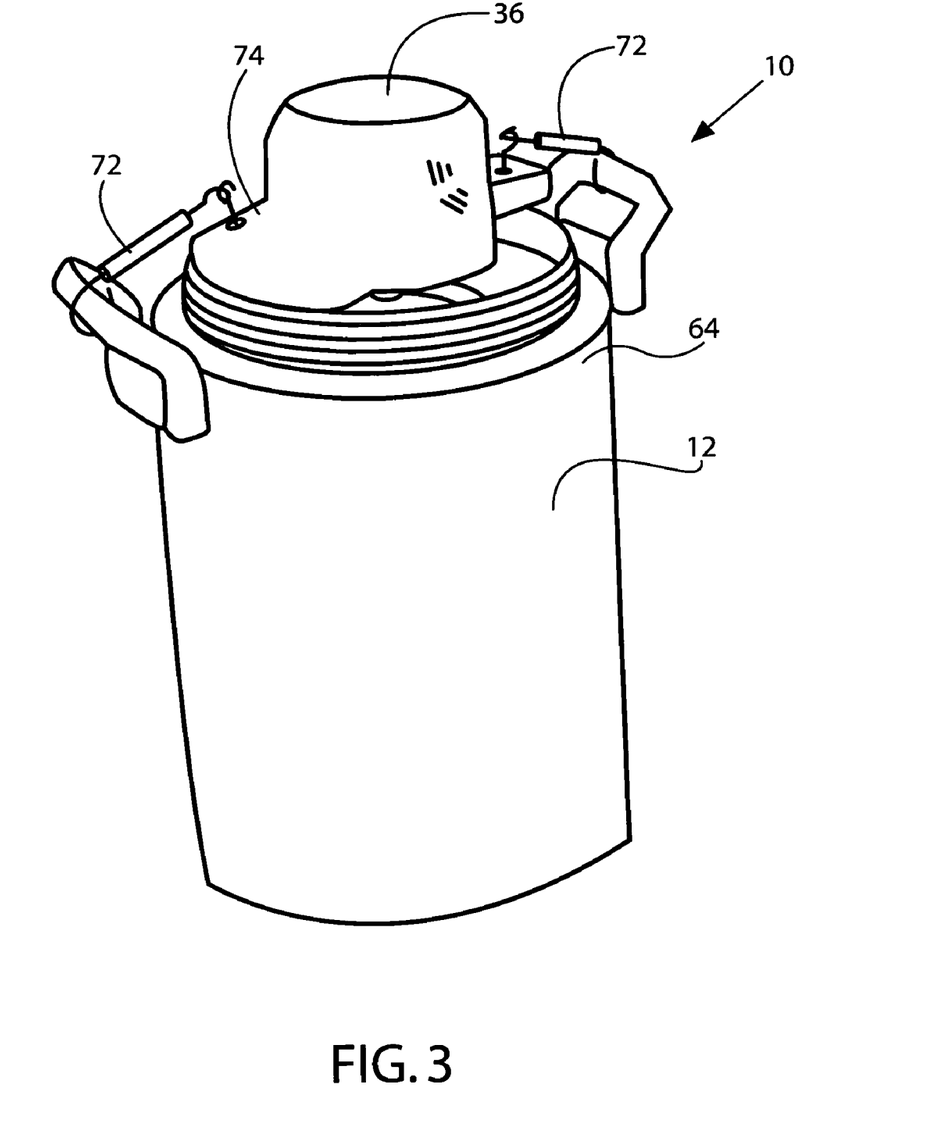
FIG. 3 is a partial perspective view of the invention according to one embodiment of the invention in which such motor has been secured to such first housing member.

A motor 36 is operably connectable to at least one of such first housing member 12, such second housing member 18, such first lid member 28, such mixing member 26, and such combination thereof for enabling at least one of such second housing member 18 and such mixing member 26 to rotate in a predetermined direction while maintaining an opposite one of such second housing member 18 and such mixing member 26 in a stationary position such that such predetermined ingredients are mixed together.

A securing means 35 releasably secures such motor 36 to at least one of such first housing member 12, such second housing member 18, such first lid member 28, such mixing member 26, and such combination thereof.

Figure 6:
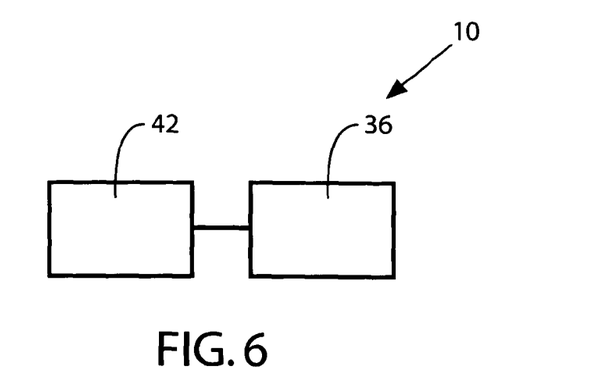
FIG. 6 is a partial schematic view of the invention according to one embodiment of the invention.

A power source 42 is operably connected to such motor 36 for supplying power thereto.

It is presently preferred that such apparatus 10 further includes a second lid member 46 releasably connectable to such first housing member 12 for covering at least one of such opening 14 at such first end 16 of such first housing member 12 when such motor 36 is not in use, such aperture 32 disposed through such first lid member 28, and a combination thereof. Such second lid member 46 being manufactured from a fourth predetermined material and having a fourth predetermined size and a fourth predetermined shape.

It is presently preferred that such apparatus 10 further includes an insert member 48 for releasably inserting into such aperture 32 disposed through such first lid member 28, such insert member 48 being for covering such aperture 32 when such motor 36 and such mixing member 26 are not in use. Such insert member 48 being manufactured from a fifth predetermined material and having a fifth predetermined size and a fifth predetermined shape. It is presently preferred that such fifth predetermined material is at least one of plastic, rubber, cork, and a combination thereof. It is presently preferred that such fifth predetermined material is rubber.

Figure 4:
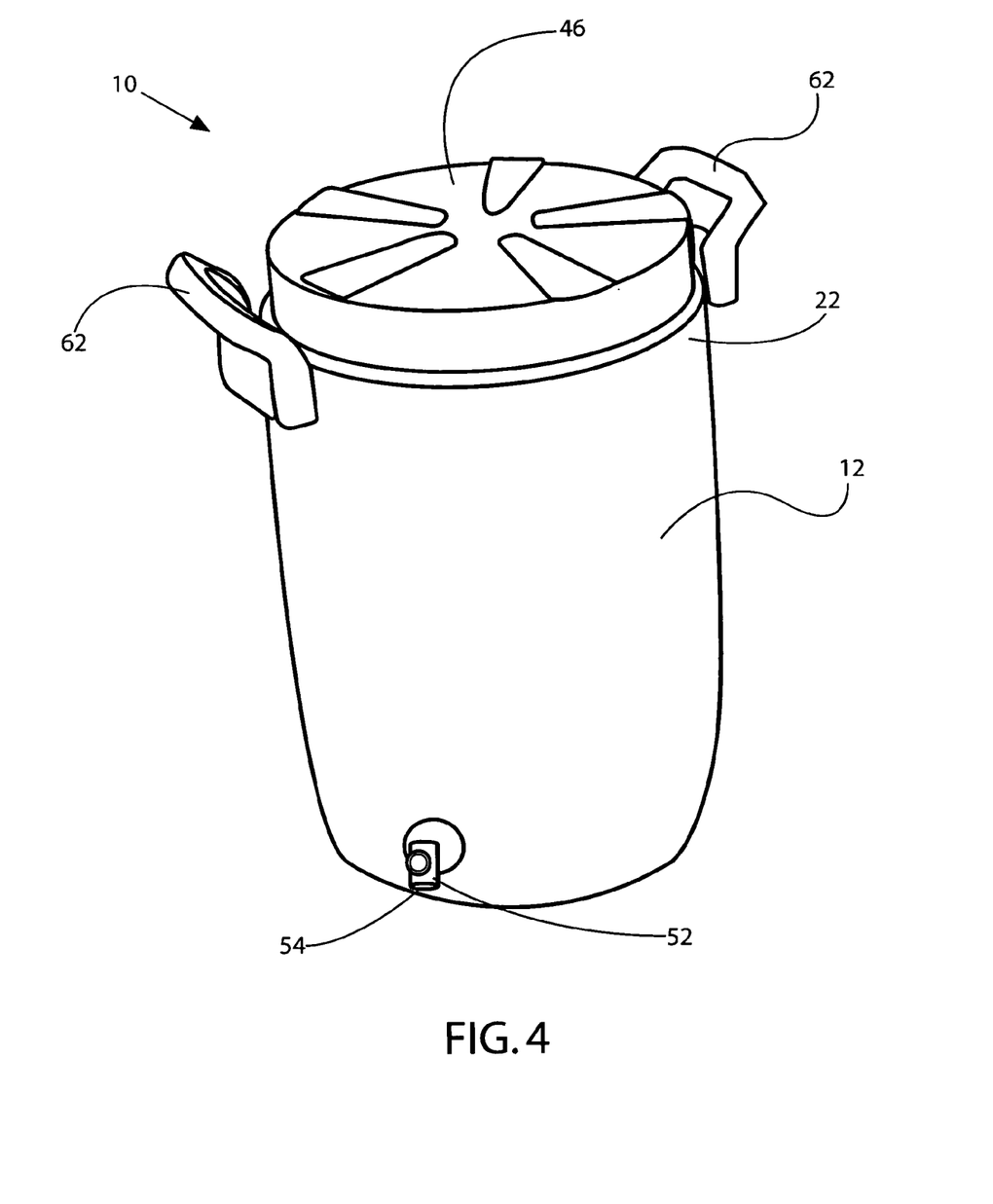
FIG. 4 is a partial perspective view of the invention according to one embodiment of the invention in which the first housing member includes a draining means in the form of a cooler type spigot disposed closely adjacent a lower end of such first housing member.

It is presently preferred that such first housing member 12 includes a draining means 52 disposed closely adjacent a lower end thereof for draining at least one of melted ice (not shown), a salt water solution (not shown) created from ice melting and mixing with salt particles, and a combination thereof from within such first housing member. It is presently preferred that such draining means 52 is a cooler type spigot 54.

Figure 5:
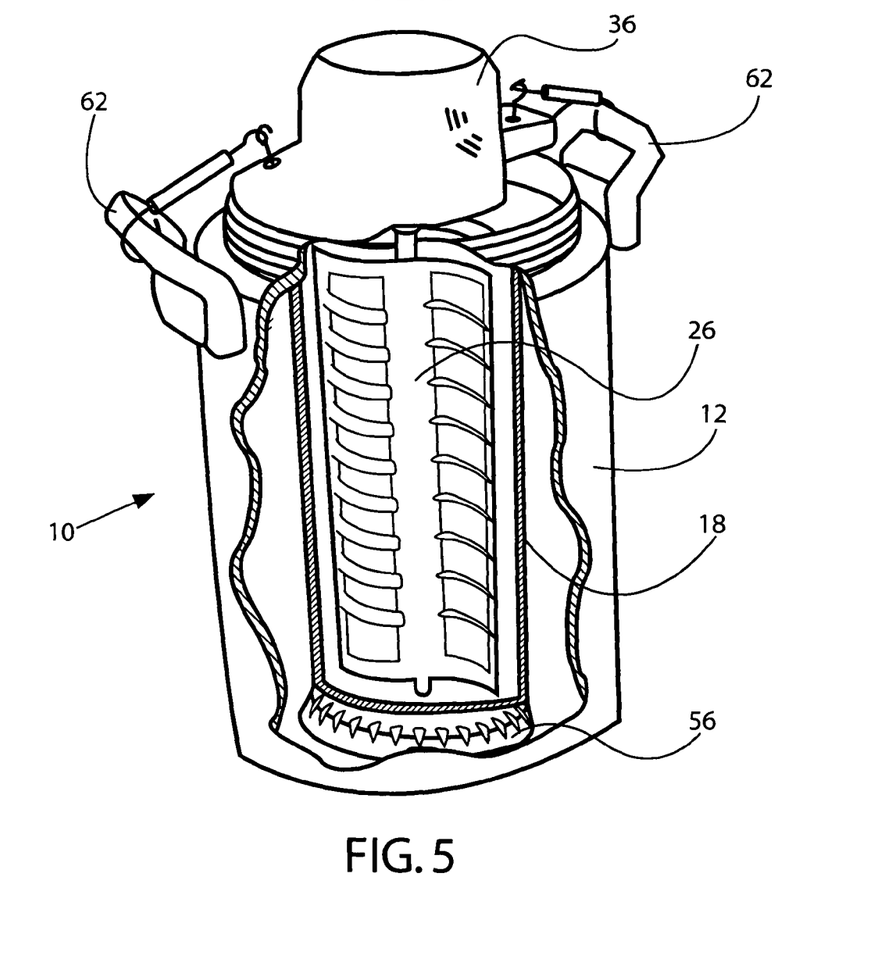
FIG. 5 is a partial perspective view of the invention according to one embodiment of the invention in which a straining means is disposed within such first housing member closely adjacent a lower end thereof.

It is presently preferred that such apparatus 10 further includes a straining means 56 engageable within a second predetermined interior portion of such first housing member 12 closely adjacent a lower end thereof for retaining at least one of pieces of ice (not shown), pieces of salt (not shown), and a combination thereof within a third predetermined interior portion of such first housing member 12 during draining.

It is presently preferred that such first housing member 12 includes a pair of handles 62, each of such handles 62 being disposed closely adjacent an upper outer portion 64 of such first housing member 12 on opposite sides of such first housing member 12 equidistant.

It is presently preferred that such securing means 35 includes such motor 36 having a pair of turnbuckles 72 disposed on an outer surface 74 thereof thereof on opposites sides of such motor 36 equidistant, each of such turnbuckles 72 being releasably attachable to each of such handle members 62 disposed on such first housing member 12.

It is presently preferred that such apparatus 10 further includes a covering ring 78 for covering a predetermined portion of such opening 14 at such first predetermined end 16 of such first housing member 12. Such covering ring 78 being releasably connectable to at least one of such first housing member 12, such second housing member 18, and a combination thereof. Such covering ring 78 being manufactured from a sixth predetermined material and having a sixth predetermined shape and a sixth predetermined size.

It is presently preferred that such covering ring 78 is a sufficient width to cover the distance between an interior wall 82 of such first housing member 12 and an exterior wall 84 of such second housing member 18 when such second housing member 18 is within such first housing member 12 such that a predetermined amount of ice (not shown) and a predetermined amount of salt (not shown) may be placed between such interior wall 82 of such first housing member 12 and such exterior wall 84 of such second housing member 18 and when such covering ring 78 is in place such ice and such salt will be unable to enter such second housing member 18 when such first lid member 28 is not covering such second housing member 18.

It is presently preferred that such apparatus 10 further includes an insulation member 86 for placement within such first housing member 12 closely adjacent an upper end 88 thereof and wherein such insulation member 86 fits beneath such second lid member 46 when such second lid member 46 is in place, such insulation member 86 being manufactured from a seventh predetermined material and having a seventh predetermined shape and size.

It is contemplated that turning such motor on may be accomplished by plugging an electric cord extending from such motor into an electric power outlet and it is further contemplated that unplugging such electric cord will turn the motor off. However, the device is not meant to be limited as such and it is further contemplated that a switch means may be operably connected intermediate such power source and such motor for selectively turning such motor on and off. It is further contemplated that such power source may be a battery.

In the preferred embodiment, it is meant that each part of such device 10 be assembled as specified such that a frozen confection can be made and once such frozen confection is made then such motor 36 and such mixing member 26 be removed from the device 10 such that a user (not shown) may place the first lid member 28 on such second housing member 18, insert such insert member 48 into the aperture 32 disposed through such first lid member 28, place the ring member 78 in position to cover salt and ice disposed between the inner wall 82 of such first housing member 12 and the outer wall 84 of second housing member 18, place the insulation member 86 place on top of the ring member 78 and such second lid member 28, place the second lid member 46 in position to cover the opening 14 disposed therein as well as the contents of such first housing member 12, and transport the first housing member 12 and all its contents to a desired location. It is further meant that such draining means 52 be used in cooperation with such straining means 56 to drain liquid from within such first housing member 12 as often as desired thereby creating space within which more ice and salt can be added to continue to keep the frozen confection within such second housing member 18 cold for as long as desired by such user.

According to another embodiment, a method of making frozen confections is provided. Such method includes the steps of providing an apparatus for making, storing, and transporting frozen confections, such apparatus having a first substantially hollow housing member having an opening at a first predetermined end thereof, such first housing member being manufactured from a first predetermined material and having a first predetermined size and a first predetermined shape, a second substantially hollow housing member for fitting within a predetermined interior portion of such first housing member, such second housing member having an opening at a first predetermined end thereof for housing at least one of predetermined ingredients for making a frozen confection, a predetermined consumable item, and a combination thereof, such second housing member being manufactured from a second predetermined material and having a second predetermined size and a second predetermined shape, a mixing member releasably engageable within an interior portion of such second housing member for mixing such predetermined ingredients, a first lid member releasably connectable to such second housing member for covering such opening at such first end of such second housing member, such first lid member having an aperture disposed therethrough for receiving a first predetermined end of such mixing member, such first lid member being manufactured from a third predetermined material and having a third predetermined size and a third predetermined shape, a motor operably connectable to at least one of such first housing member, such second housing member, such first lid member, such mixing member, and a combination thereof for enabling at least one of such second housing member and such mixing member to rotate in a predetermined direction while maintaining an opposite one of such second housing member and such mixing member in a stationary position such that such predetermined ingredients are mixed together, a securing means for releasably securing such motor member to at least one of such first housing member, such second housing member, such first lid member, such mixing member, and a combination thereof, a power source operably connected to such motor for supplying power thereto. Such method further includes the steps of providing such predetermined ingredients for making a frozen confection, placing such mixing member within such second housing member, placing such predetermined ingredients within such second housing member, covering such second housing member with such first lid member such that such first end of such mixing member is disposed within such aperture, placing such second housing within such first housing member, providing a predetermined amount of salt and a predetermined amount of ice and placing such predetermined amount of salt and such predetermined amount of ice between an inner wall of such first housing member and an outer wall of such second housing member, securing such motor to at least one of such first housing member, second housing member, such first lid member, such mixing member, and a combination thereof, turning such motor on, and turning such motor off when such predetermined ingredients are mixed and a predetermined frozen confection has formed. It is contemplated that turning such motor on may be accomplished by plugging an electric cord extending from such motor into an electric power outlet and it is further contemplated that unplugging such electric cord will turn the motor off. However, the device is not meant to be limited as such and it is further contemplated that a switch means may be operably connected intermediate such power source and such motor for selectively turning such motor on and off. It is further contemplated that such power source may be a battery.

While a presently preferred and various alternative embodiments of the present invention have been described in sufficient detail above to enable a person skilled in the relevant art to make and use the same it should be obvious that various other adaptations and modifications can be envisioned by those persons skilled in such art without departing from either the spirit of the invention or the scope of the appended claims.

We claim:

1. An apparatus for making, storing, and transporting frozen confections, said apparatus comprising:
   a. a first substantially hollow housing member having an opening at a first predetermined end thereof, said first housing member being manufactured from a first predetermined material and having a first predetermined size and a first predetermined shape;
   b. a second substantially hollow housing member for fitting within a first predetermined interior portion of said first housing member, said second housing member having an opening at a first predetermined end thereof for receiving at least one of predetermined ingredients for making a frozen confection, a predetermined consumable item, and a combination thereof, said second housing member being manufactured from a second predetermined material and having a second predetermined size and a second predetermined shape, wherein the second substantially hollow housing member is removable from the first substantially hollow housing member;
   c. a mixing member releasably engageable within a predetermined interior portion of said second housing member for mixing said predetermined ingredients;
   d. a first lid member releasably connectable to said second housing member for covering said opening at said first end of said second housing member, said first lid member having an aperture disposed there through for receiving a first predetermined end of said mixing member, said first lid member being manufactured from a third predetermined material and having a third predetermined size and a third predetermined shape;
   e. a motor operably connected directly to said mixing member and at least one of said first predetermined end of said housing member, said first predetermined end of said second housing member, said first lid member, and a combination thereof for enabling said mixing member to rotate in a predetermined direction while maintaining said second housing member in a stationary position such that said predetermined ingredients are mixed together;
   f. securing means for releasably securing said motor to at least one of said first predetermined end of said housing member, said first predetermined end of said second housing member, said first lid member, and a combination thereof; and
   g. a power source operably connected to said motor for supplying power thereto.

2. An apparatus for making, storing, and transporting frozen confections according to claim 1 wherein said apparatus further includes a second lid member releasably connectable to said first housing member for covering at least one of said opening at said first end of said first housing member when said motor is not in use, said aperture disposed through said first lid member, and a combination thereof, said second lid member being manufactured from a fourth predetermined material and having a fourth predetermined size and a fourth predetermined shape.

3. An apparatus for making, storing, and transporting frozen confections according to claim 1 wherein said apparatus further includes an insert member for releasably inserting into said aperture disposed through said first lid member for covering said aperture when said motor and said mixing member are not in use, said insert member being manufactured from a fifth predetermined material and having a fifth predetermined size and a fifth predetermined shape.

4. An apparatus for making, storing, and transporting frozen confections according to claim 3 wherein said fifth predetermined material is at least one of plastic, rubber, cork, and a combination thereof.

5. An apparatus for making, storing, and transporting frozen confections according to claim 1 wherein said first housing member is insulated.

6. An apparatus for making, storing, and transporting frozen confections according to claim 1 wherein said first predetermined material is plastic.

7. An apparatus for making, storing, and transporting frozen confections according to claim 1 wherein said first predetermined shape is a cylinder.

8. An apparatus for making, storing, and transporting frozen confections according to claim 1 wherein said second predetermined material is a metal.

9. An apparatus for making, storing, and transporting frozen confections according to claim 1 wherein said second predetermined shape is a cylinder.

10. An apparatus for making, storing, and transporting frozen confections according to claim 1 wherein said first housing member includes a draining means disposed closely adjacent a lower end thereof for draining at least one of melted ice, a salt water solution created from ice melting and mixing with salt particles, and a combination thereof from within said first housing member.

11. An apparatus for making, storing, and transporting frozen confections according to claim 10 wherein said draining means is a beverage cooler type spigot.

12. An apparatus for making, storing, and transporting frozen confections according to claim 11 wherein said apparatus further includes a straining means engageable within a second predetermined interior portion of said first housing member closely adjacent a lower end thereof for retaining at least one of pieces of ice, pieces of salt, and a combination thereof within a third predetermined interior portion of said first housing during draining.

13. An apparatus for making, storing, and transporting frozen confections according to claim 1 wherein said first housing member includes a pair of handles, each of said handles being disposed closely adjacent an upper outer portion of said first housing member on opposite sides of said first housing member equidistant.

14. An apparatus for making, storing, and transporting frozen confections according to claim 13 wherein said securing means includes said motor having a pair of turnbuckles disposed on an outer surface thereof on opposites sides of said motor equidistant, each of said turnbuckles being releasably attachable to each of said handle members disposed on said first housing member.

15. An apparatus for making, storing, and transporting frozen confections according to claim 1 wherein said apparatus further includes a covering ring for covering a predetermined portion of said opening at said first predetermined end of said first housing member, said covering ring being releasably connectable to at least one of said first housing member, said second housing member, and a combination thereof, said covering ring being manufactured from a sixth predetermined material and having a sixth predetermined shape and a sixth predetermined size.

16. An apparatus for making, storing, and transporting frozen confections according to claim 15 wherein said covering ring is a sufficient width to cover the distance between an interior wall of said first housing member and an exterior wall of said second housing member when said second housing member is within said first housing member such that a predetermined amount of ice and a predetermined amount of salt may be placed between said interior wall of said first housing member and said exterior wall of said second housing member and when said covering ring is in place such ice and such salt will be unable to enter said second housing member when said first lid member is not covering said second housing member.

17. An apparatus for making, storing, and transporting frozen confections according to claim 2 wherein said apparatus further includes an insulation member for placement within said first housing member closely adjacent an upper end thereof and wherein said insulation member fits beneath said second lid member when said second lid member is in place, said insulation member being manufactured from a seventh predetermined material and having a seventh predetermined shape and size.

18. A method of making frozen confections comprising the steps of:
 a. providing an apparatus for making, storing, and transporting frozen confections, said apparatus including;
  i. a first substantially hollow housing member having an opening at a first predetermined end thereof, said first housing member being manufactured from a first predetermined material and having a first predetermined size and a first predetermined shape;
  ii. a second substantially hollow housing member for fitting within a predetermined interior portion of said first housing member, said second housing member having an opening at a first predetermined end thereof for housing at least one of predetermined ingredients for making a frozen confection, a predetermined consumable item, and a combination thereof, said second housing member being manufactured from a second predetermined material and having a second predetermined size and a second predetermined shape;
  iii. a mixing member releasably disposable within an interior portion of said second housing member for mixing said predetermined ingredients, wherein the second substantially hollow housing member is removable from the first substantially hollow housing member;
  iv. a first lid member releasably connectable to said second housing member for covering said opening at said first end of said second housing member, said first lid member having an aperture disposed there through for receiving a first predetermined end of said mixing member, said first lid member being manufactured from a third predetermined material and having a third predetermined size and a third predetermined shape;
  v. a motor operably connected directly to said mixing member and at least one of said first predetermined end of said housing member, said first predetermined end of said second housing member, said first lid member, and a combination thereof for enabling mixing member to rotate in a predetermined direction while maintaining said second housing member in a stationary position such that said predetermined ingredients are mixed together;
vi. securing means for releasably securing said motor member to at least one of said first predetermined end of said housing member, first predetermined end of said second housing member, said first lid member, and a combination thereof;
vii. a power source operably connected to said motor for supplying power thereto;

b. providing said predetermined ingredients for making a frozen confection;
c. placing said mixing member within said second housing member;
d. placing said predetermined ingredients within said second housing;
e. covering said second housing member with said first lid member such that said first end of said mixing member is disposed within said aperture;
f. placing said second housing within said first housing member;
g. providing a predetermined amount of salt and a predetermined amount of ice;
h. placing said predetermined amount of salt and said predetermined amount of ice between an inner wall of said first housing member and an outer wall of said second housing member;
i. securing said motor to at least one of said second housing member, said first lid member, said first predetermined end of said mixing member, and a combination thereof;
j. turning said motor on; and
k. turning said motor off when said predetermined ingredients are mixed and a predetermined frozen confection has formed.

19. An apparatus for making, storing, and transporting frozen confections, said apparatus comprising:
a. a first substantially hollow housing member having an opening at a first predetermined end thereof;
b. a second substantially hollow housing member sized to fit within a first predetermined interior portion of said first housing member, said second housing member having an opening at a first predetermined end thereof for receiving at least one of predetermined ingredients for making a frozen confection, a predetermined consumable item, and a combination thereof, wherein the second substantially hollow housing member is removable from the first substantially hollow housing member;
c. a mixing member having at least two substantially solid vanes and releasably engageable within a predetermined interior portion of said second housing member;
d. a first lid member releasably connectable to said second housing member for covering said opening at said first end of said second housing member, said first lid member having an aperture disposed there through for receiving a first predetermined end of said mixing member;
e. a motor operably connected directly to said mixing member and at least one of said first predetermined end of said housing member, said first predetermined end of said second housing member, said first lid member, and a combination thereof, said motor operable to rotate said mixing member in a predetermined direction while maintaining said second housing member in a stationary position such that said predetermined ingredients are mixed together;
f. a power source operably connected to said motor for supplying power thereto;
g. a pair of handles, each of said pair of handles being disposed closely adjacent an upper outer portion of said first housing member on opposite sides of said first housing member and forming apertures adjacent an outer surface of said first housing;
h. a pair of turnbuckles, each releasably attachable at one end to said aperture formed by said handle and attachable at the other end to said motor; and
i. a drain having each of an internal strainer and an external spigot disposed closely adjacent a lower end thereof for draining at least one of melted ice, a salt water solution created from ice melting and mixing with salt particles, and a combination thereof from within said first housing member.

\* \* \* \* \*